(12) United States Patent
Lang (10) Patent No.: US 6,879,678 B1
(45) Date of Patent: Apr. 12, 2005

(54) SYSTEM AND METHOD FOR ESTABLISHING LONG DISTANCE CALL CONNECTIONS USING A PERSONAL COMMUNICATION ASSISTANT

(75) Inventor: Alexander C. Lang, Toronto (CA)

(73) Assignee: Softalk, Inc., Toronto (CA)

( * ) Notice: Subject to any disclaimer, the term of this patent is extended or adjusted under 35 U.S.C. 154(b) by 383 days.

(21) Appl. No.: 09/709,343

(22) Filed: Nov. 13, 2000

(51) Int. Cl.[7] .............................................. H04M 3/00
(52) U.S. Cl. .................................. 379/219; 379/201.01
(58) Field of Search ........................... 379/219, 220.01, 379/221.02, 221.06, 88.13, 88.22, 93.01, 222, 230, 201.01

(56) References Cited

U.S. PATENT DOCUMENTS

| | | | | |
|---|---|---|---|---|
| 5,185,785 A | * | 2/1993 | Funk et al. ................... | 379/111 |
| 5,742,668 A | * | 4/1998 | Pepe et al. .................... | 379/58 |
| 5,742,905 A | * | 4/1998 | Pepe et al. ................... | 455/461 |
| 6,317,792 B1 | * | 11/2001 | Mundy et al. ............... | 709/227 |
| 6,584,490 B1 | * | 6/2003 | Schuster et al. ............. | 709/200 |
| 2001/0010047 A1 | * | 7/2001 | Shen et al. ................... | 705/400 |
| 2001/0026609 A1 | * | 10/2001 | Weinstein et al. .......... | 379/93.01 |
| 2003/0068018 A1 | * | 4/2003 | Huna ............................ | 379/88.14 |
| 2003/0115353 A1 | * | 6/2003 | Deryugin et al. ............ | 709/231 |

FOREIGN PATENT DOCUMENTS

| | | | |
|---|---|---|---|
| CA | 2239493 | 6/1997 | .......... H04L/12/66 |
| CA | 2248660 | 9/1997 | |
| CA | 2198024 | 8/1998 | |

OTHER PUBLICATIONS

Low, C., "The Internet Telephony Red Herring", Hewlett Packard Laboratories, Bristol, U.K., IEEE 1996, pp. 72–80.

* cited by examiner

Primary Examiner—William J. Deane, Jr.
(74) Attorney, Agent, or Firm—Thomas, Kayden, Horstemeyer & Risley, LLP (57) ABSTRACT

A system and method to enable establishment of long distance call connections, from a personal communication assistant (PCA), such as a personal wireless digital assistant, via a packet network, such as the Internet is provided. The system includes a call completion application adapted for communication with a long distance service provider server for establishing a cost effective long distance call connection. The system is further adapted to provide call scheduling and point of presence (POP) optimization within the PSTN.

60 Claims, 8 Drawing Sheets

SYSTEM AND METHOD FOR ESTABLISHING LONG DISTANCE CALL CONNECTIONS USING A PERSONAL COMMUNICATION ASSISTANT

CROSS-REFERENCE TO RELATED APPLICATIONS

This is the first application filed for the present invention.

MICROFICHE APPENDIX

Not applicable.

TECHNICAL FIELD

This invention relates, in general, to a system and method for establishing long distance call connections using a packet network, such as the Internet. In particular, the invention relates to a system and method for establishing a cost effective long distance call connection between designated call locations using a personal communication assistant adapted to communicate with a long distance service provider server via a packet network.

BACKGROUND OF TEE INVENTION

Traditional modes of communication have evolved in recent years with the rapid growth of Internet-based technologies and increasing consumer demands for convenient communication tools. Mobile communication systems have become particularly popular as consumers increasingly require the ability to conduct communications while in transit or temporarily relocated. For example, call connections are frequently established using mobile cellular telephones, in-flight telephones, two-way pagers and a plurality of other communication devices. Such tools provide the ability to place or arrange communication sessions from almost anywhere.

Telephone communication is still generally considered the most effective mode of communicating because it permits parties to conduct two-way high quality voice communication in real time. Unfortunately, however, this efficiency comes at an expense, particularly when mobile telephone devices are employed. Mobile telephone devices are supported by mobile telephone service providers that provide the service in predefined areas. Conventionally, users of mobile telephone service purchase flat fee packages from the service provider which specify certain limitations and fees associated with the user's activity. As is well known, most mobile telephone packages allocate a predetermined number of "free" minutes of local airtime for both incoming and outgoing local calls. Any airtime used beyond this allocation is then added to the user's invoice. Likewise, long distance charges apply to all long distance calls conducted with the mobile telephone device.

Regardless of the mobile telephone package, airtime on mobile telephone devices is charged at a premium. In particular, the costs associated with a mobile telephone device can quickly accumulate as a user is charged for airtime used for both incoming and outgoing calls. Thus, additional charges are applied not only for long distance calls using the mobile telephone device but also when a user exceeds the allocated number of airtime minutes provided by the package. It can therefore become difficult to control the expenses that accumulate with mobile telephone use. In addition, the industry is poised for the advent of new mobile $3^{rd}$ generation devices, such as wide band devices capable of video communications, and the like. As these wide band devices become more prevalent, it will be more important than ever to optimize their use because per minute costs will increase as bandwidth utilization increases with such devices.

Likewise, telephone calls made from so-called "convenience" telephones, such as those found in airplanes, trains, taxis, hotels and phone booths are generally more expensive to use than other wireline phone terminations. Hereinafter, such telephones are collectively referred to as convenience telephones.

In recent years, several systems have been invented for using the Internet to establish telephone connections. These systems use Worldwide Web (WWW) technology to permit the setup of PSTN calls. For example, Applicant's copending U.S. patent application Ser. No. 09/642,671 filed Aug. 22, 2000 describes a system and method for establishing long distance calls using a desktop application. As described in that patent application, a desktop application is adapted to initiate a call connection at a long distance service provider (LDSP) server via a data packet network such as the Internet. A customer uses the application to specify origination and destination information pertaining to a call request. This information is sent to the LDSP via the data packet network. The LDSP processes the call request and effects call initiation at a switch within the PSTN. In particular, the LDSP verifies the call connection request and effects respective call connections to the origination- and destination numbers at a PSTN switch. The calls are subsequently bridged together to complete the call connection. The system also provides a user with a variety of call management features.

Providers of such long distance services are typically able to offer discount long distance rates to users because they are not obliged to maintain a great deal of infrastructure in order to offer the service. Such systems have proven to be very useful to large businesses where numerous long distance calls are made each day. By employing the Applicant's system, a cost savings can be realized, as compared to paying conventional long distance rates for long distance telephone service.

However, to date, access to this service has been restricted to a location where a user has both telephone and Internet access. Establishing long distance call connections using the Internet has not been practical for convenience telephones that incur long distance fees. In particular, convenience telephones are not generally located in the vicinity of a computer having access to the Internet. Most often a user of Applicant's systems for initiating telephone calls uses a conventional wireline telephone for the purpose of establishing a long distance call.

As technology continues to be driven by consumer demand for convenience, rapid growth is occurring in the market for smaller, more mobile and user-friendly communication devices. One such device is the personal digital assistant (PDA) which offers consumers the convenience of a personal computer in a hand-held portable device. PDAs offer the ability to attend to personal and business computing, Internet access and communication services while in transit, from almost any location. Certain PDAs are also equipped with wireless capability which permits wireless, mobile access to the Internet. Likewise, personal communication services (PCS) phones equipped with wireless application protocol (WAP) now have the ability to access the WWW.

These smaller, portable personal computing devices are poised to be the personal computing devices of choice in the near future. Thus, there is an increasing demand for cost-effective services accessible to such devices. In particular, with the frequency of international travel both for personal and business purposes, there is demand for a cost effective means of conducting long distance voice communications using mobile and convenience telephones.

There therefore exists a need for a system adapted to be used with portable computing devices that can harness the power of a packet network, such as the Internet, to establish long distance telephone calls in an efficient, convenient and cost effective manner.

SUMMARY OF THE INVENTION

It is an object of the present invention to provide a system and method for establishing long distance call connections via a packet network from a personal communication assistant.

It is another object of the invention to provide a system and method for establishing long distance call connections via a packet network that includes a personal communication assistant capable of automatically connecting to a long distance service provider server and identifying a subscriber thereto.

It is yet another object of the invention to provide a system and method for establishing a long distance call connection in a switched telephone network (STN) between telephone numbers specified in a call completion application, wherein an application determines a most cost effective point of presence (POP) within the STN for establishing the long distance call connection.

It is a further object of the invention to provide a personal communication assistant configured with a call completion application adapted to permit call scheduling.

According to one aspect of the present invention there is provided a method of completing a long distance call connection through the public switched telephone network (PSTN) from a personal communication assistant (PCA), said method comprising (a) accepting call request information specified by a subscriber using an interface supported by the PCA; (b) formulating a call connection request message based on the call request information, the call connection request message including a point of presence (POP) code; and (c) forwarding the call connection request message via a communications connection established between the PCA and a long distance service provider server (LDSP) to initiate the call connection.

According to another aspect of the invention there is provided a method of completing a long distance call connection through the public switched telephone network (PSTN) from a call completion application operating locally on a personal communication assistant (PCA) adapted for communications with a long distance service provider server via a packet network, said method comprising steps of: (a) receiving a call connection request message at the long distance service provider server, sent from the PCA; (b) verifying user identification information contained in the message; (c) processing the call connection request message to initiate a call connection according to the call request information; and (d) sending a notification message to the PCA to notify a subscriber that the call connection is in progress.

According to a further aspect of the invention there is provided a system for establishing a long distance call connection through the PSTN, using a personal communication assistant (PCA), said system comprising: (a) a long distance service provider (LDSP) server adapted to establish said call connection through the PSTN in response to a call connection request message received from a registered subscriber; and (b) an application adapted to operate locally on the PCA to accept call request information from the registered subscriber; formulate the call connection request message based on the call request information; and communicate the call connection request message to the long distance service provider server; wherein the long distance service provider server is adapted to effect a long distance call connection on the basis of the call connection request message.

According to yet another aspect of the invention there is provided a call completion application adapted to operate locally on a personal communication assistant (PCA) to establish a communication connection with a long distance service provider (LDSP) server, said call completion application comprising: (a) means for accepting call connection information input by a registered subscriber; (b) means for formulating a call connection request message based on said call connection information; (c) means for determining if an existing packet network connection is available; (d) means for establishing a packet network connection if an existing packet network connection is not available; and (e) means for sending the call connection request message to said LDSP server using the packet network connection.

The ability to establish a long distance call via the Internet from a portable personal computing device, such as a PDA, allows for cost effective and convenient telephone communication from any location where Internet access is available. In particular, the system of the present invention provides an affordable alternative for using convenience telephone devices to conduct voice communications. The ability to establish cost effective long distance calls via the Internet using a personal computing device will provide both personal and business user with a convenient means for establishing voice communications while away from their usual wireline telephone. Likewise, the present invention includes several call connection features providing users with fast and easy access to call directory and call setup capabilities. As such, a user is able to initiate call connections from almost any location by inputting the necessary call connection information and call connection features provided by the present invention. Consequently, since a subscriber is provided with new calling options, the subscriber may elect not to use a cellular phone in order to save on airtime, roaming charges and premium long distance charges, such as when in an airport, hotel lobby, restaurant or other public place. The subscriber can use a PCA to set up a call to a payphone or other public use phone rather than use the cellular phone to place the call.

In particular, the present invention also provides the ability to schedule call connections as time permits, and receive a corresponding call at the designated time, for example, upon arriving at a predetermined destination. Further, the present invention includes the ability to notify parties to a call connection request that a call connection is desired and receive a response as to the availability of those parties for the call. Accordingly, a user can attempt to schedule a call as time permits and receive replies from the requested parties as to their availability for the call. The present invention provides a system for establishing long distance call connections in a convenient, efficient and cost effective manner.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a system and method for establishing long distance call connections via a data packet network. The long distance call connections are established between telephone devices across the public switched telephone network (PSTN) by a long distance service provider server (LDSP) that receives instructions from a personal communication assistant (PCA) supporting a call completion application. The PCA employed to initiate the call connection is adapted to support a call completion application as further described hereinbelow. For the purposes of this invention, a PCA may be any personal digital assistant (PDA) having wireless or wireline Internet access, any PCS telephone having Internet access, or a wireless application protocol (WAP) device or telephone with Internet access. Other examples of a PCA adaptable to support the present invention include wireless hand-held devices, wireless micro-browsers, dedicated Internet devices and two-way pagers.

In accordance with the present invention, a long distance service provider server (LDSP) provides subscribers with long distance service at reduced long distance rates where long distance communication connections are established via a data packet network. The personal communication assistant is adapted to receive call request information input by a subscriber and send such information to an LDSP server via a data packet network. The transmission of call information between the PCA and the LDSP is preferably accomplished using Web Clipping protocol, which is known in the art. The PCA may communicate with a data packet network via any suitable connection, and preferably via a wireless connection.

Figure 1:
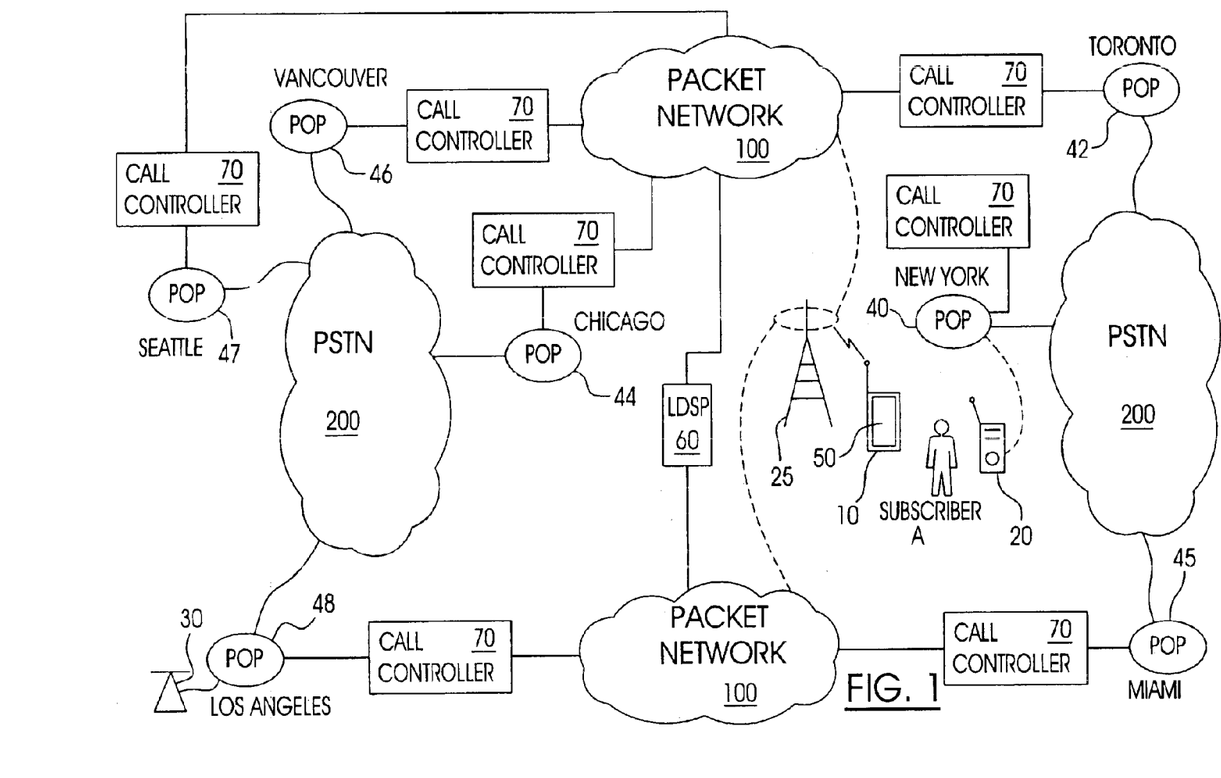
FIG. 1 is a schematic diagram of the arrangement of components in one exemplary system in accordance with the present invention.

FIG. 1 shows an overview of an exemplary system for completing a long distance call connection in accordance with one embodiment of the present invention. In accordance with this embodiment a point of presence (POP) (40, 42, 44, 45, 46, 47, 48) is provided in each of a plurality of major centers across an area to be served. A POP is a long distance service provider switch installed in a select location for servicing subscribers of services in accordance with the present invention. Preferably, a POP is provided in every major city in the service area, so as to provide subscribers with the convenience of most cost effective long distance calling. It will be evident to a person of skill in the art that a long distance service provider will establish a POP in those locations deemed to meet a predetermined cost benefit requirement. Each POP is integrated into the PSTN 200 and provides telephone switching capability as described in Applicant's copending patent application Ser. No. 08/811,099 filed Mar. 3, 1997 and allowed on Aug. 28, 2000, the specification of which is incorporated herein by reference. Alternatively, a POP may be a selected existing toll switch within the PSTN.

Also shown in FIG. 1, a long distance service provider server (LDSP) 60 is connected to a data packet network 100, such as the Internet. The long distance service provider server (LDSP) 60 controls and manages long distance service provided in accordance with the present invention. Subscribers to the long distance service invoke the services via the data packet network 100. In particular, subscribers to the service initiate a call connection request from a personal communication assistant (PCA) 10, such as a portable digital assistant for example. A PCA 10 may establish any suitable communication connection with the data packet network 100, as is known in the art. Given the advantage of employing the present invention to minimize long distance expenses while traveling, a wireless connection to the data packet network 100 is optimal.

As shown in the example of FIG. 1, a subscriber A is traveling in New York City. Subscriber A is equipped with a PCA 10 and a cellular telephone 20. Subscriber A would like to establish a cost-effective long distance call connection with a party located in Los Angeles. As a matter of convenience, subscriber A would like to receive this call connection on his cellular telephone 20. As a subscriber to the long distance service provided by the long distance service provider supporting LDSP 60, subscriber A has a call completion application 50 installed on his PCA 10 for enabling a call connection request to the LDSP 60. Typically, application 50 is provided to the subscriber when subscription to the services of the long distance service provider is effected. The application 50 may be installed directly on a PCA 10 or downloaded from a worldwide web server. In either case, the application 50 preferably resides locally on PCA 10 for fast and convenient initiation of a call request.

When a call connection is desired, subscriber A inputs the call request information using application 50 supported on his PCA 10. Such information includes at least a designation of the parties to the call. This information may be stored in a memory within the PCA 10, by obtained from a directory accessed via the data packet network 100 or manually inputted by the subscriber A. The call request information input by the subscriber may include a POP code indicating a preferred POP from which the call connection is to be established. As will be explained below in more detail, the POP code may be left blank, or a POP override parameter may be associated with the POP enabling a POP override. A POP override instructs the LDSP 60 to execute a POP optimization algorithm to determine an optimal POP for carrying the call on the basis of a least-cost call to the subscriber.

Based on the call request information, application 50 generates a call connection request message and forwards this message to the LDSP 60 via a suitable communication connection. As shown in the embodiment illustrated in FIG. 1, a wireless connection is established via a transmission tower 25 between the PCA 10 and the data packet network 100. However, any suitable communication connection may be employed for the purposes of the present invention. The call connection request message is routed across data packet network 100 and arrives at LDSP 60. At LDSP 60, the call connection request message may be directed to a call request queue until call processing capacity is available for processing the call request.

Authorization steps are performed by LDSP 60 to verify the origin of the call connection request, as will be discussed in more detail below. Subsequently, LDSP 60 interprets the contents of the message and proceeds to establish a call connection accordingly. In addition to extracting an originating telephone number and at least one destination number, LDSP 60 may extract a POP code from the call request. If a POP code is not specified, or a POP override flag is set, the LDSP may consult a routing pairs table to select a POP within the switched telephone network (STN) to originate the call connection, to provide a least-cost service for the subscriber, as will be described below in more detail.

Regardless of the method used to select a POP within the STN, LDSP 60 proceeds to initiate a call connection at the designated POP. As illustrated in FIG. 1, POP 40 is selected to originate the call connection. In this example, POP 40 is in the local calling area of subscriber A who is "roaming" in New York. A call connection information packet is generated at LDSP 60 and routed via the packet network 100 to the designated POP 40, as will also be described in more detail below. At POP 40, a call connection information packet provides instructions for establishing calls to the originating and destination numbers specified in the call request. These calls are subsequently bridged together by POP 40 and the long distance call connection is thereby established.

As noted above, it is a known practice for long distance service providers (LDSPs) to provide subscribers with access to PSTN toll services via the Internet using Applicant's technology. In response to a call connection request message received via the Internet, a call connection information packet is dispatched from the LDSP server 60 to a call controller 70 associated with ta specified POP. Call controller 70 is connected by a signaling link to a PSTN toll switch and controls connections made through the PSTN by the toll switch. The PSTN toll switch is typically a time division multiplexed (TDM) switch. Call controller 70 interprets the call connection information packet and instructs the toll switch to establish calls to the specified telephone numbers. It will be understood by those skilled in the art that details such as the PSTN Common Channel Signaling Network (typically an SS7 signaling network) are not illustrated for the purpose of clarity.

As shown in FIG. 1, a local call is made from POP 40 to cellular telephone 20. Since subscriber A receives the call on a cellular telephone, and the POP 40 is within the local exchange area of the subscriber's location in New York, the subscriber avoids incurring incoming long distance charges from the cellular telephone service provider. Subsequently, a long distance call is initiated from POP 40 to the destination number, depicted as a wireline telephone 30 in Los Angeles in FIG. 1. This long distance call is carried by the PSTN 200. In this example, two calls are established from POP 40 and then bridged to provide a call connection between the cellular telephone 20 and the wireline telephone 30. Since the call connection was established by the LDSP 60, the long distance charges incurred by the call connection are determined according the rates associated therewith. Thus, subscriber A only pays long distance service charges to the long distance service provider supporting LDSP 60. Subscriber A therefore benefits from the discount long distance rates and enjoys the convenience of cellular telephone use without the expense of inbound long distance service charges. As will be understood by those skilled in the art, a cellular telephone subscriber can benefit from use of the invention without roaming, since calls originated in accordance with the invention are subject to appreciably lower long distance rates, provided that a local POP is used to originate the call. Furthermore, the present invention permits calls to be completed to any phone that can be searched by a dialable number from the PSTN. The system in accordance with the invention therefore permits calls to be placed at discount rates from convenience phones such as payphones, and other public telephones, or from any private wireline telephone without incurring charges to the telephone owner.

Figure 2A:
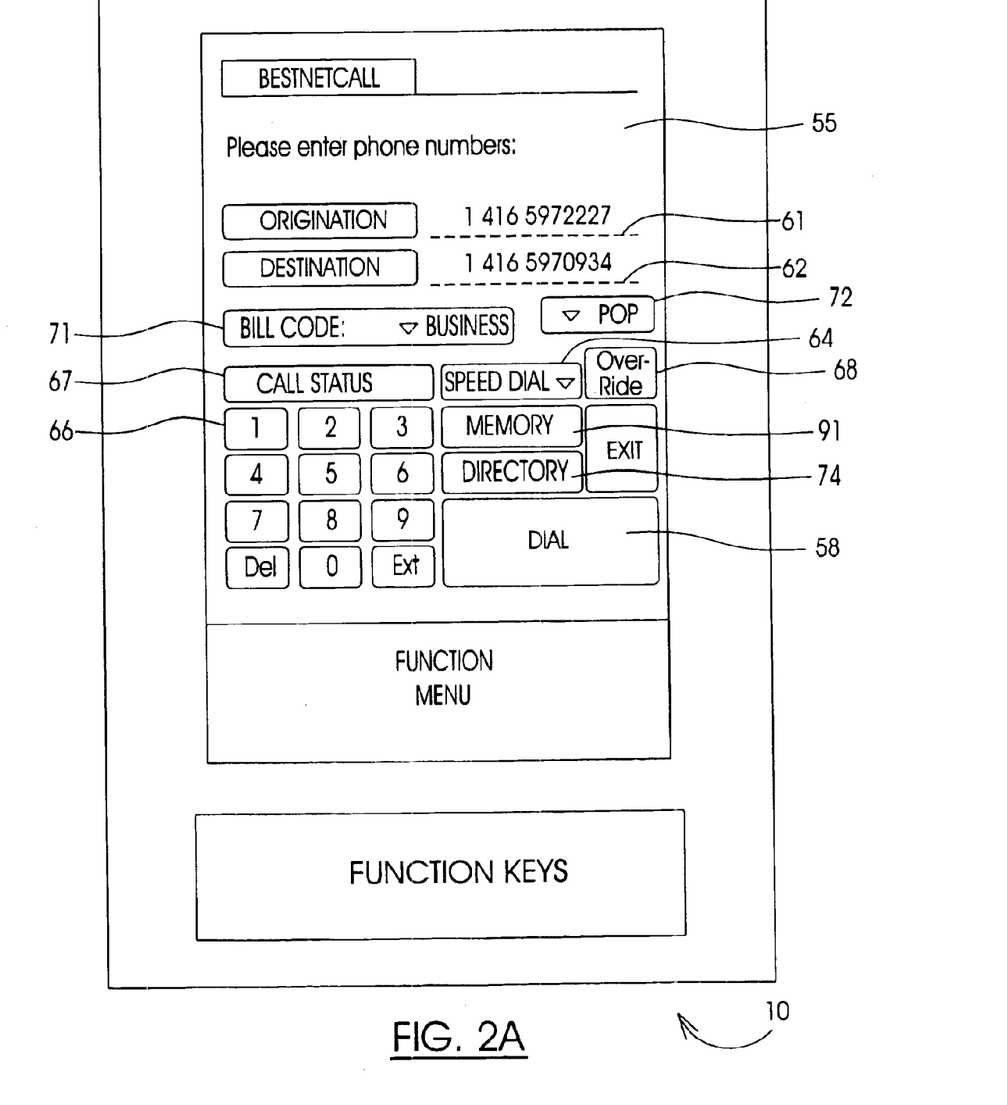
FIG. 2A is an illustration of a graphic user interface (GUI) of a personal communication assistant in accordance with an embodiment of the present invention.

FIG. 2A illustrates an example of a PCA 10 configured to support a call completion application 50 according to an embodiment of the present invention. Call completion application 50 provides means to input call information and initiate a long distance call connection via a data packet network. Call completion application 50 provides a graphical user interface (GUI) 55 adapted for use with a PCA having built-in functionality for establishing call connections between designated telephone devices over the PSTN. The call completion application 50 preferably includes a plurality of data input screens tailored to enable specific built-in features. One example of an input screen of GUI 55 is illustrated in FIG. 2A. In accordance with this embodiment, GUI 55 provides a subscriber using a PCA provisioned with the call completion application 50 with a convenient and efficient means for initiating a call connection request. Although the call completion application 50 may be accessed from a service provider website, it preferably resides locally on the PCA for fast and easy access when a call connection is desired. Further, the call completion application 50 may be programmed to automatically identify a subscriber each time a call connection request message is formulated. Thereby eliminating a requirement for entering User ID and password information each time a call connection is desired.

Call request information is input into GUI 55, and a call connection is enabled by selecting a call feature, for example a dial icon 58. Call request information such as telephone numbers may be manually input into information fields within GUI 55, such as originating (calling) party number 61 and destination (called) party number 62. Typically, a subscriber using call completion application 50 is a party to the call, and a dial number (DN) of a telephone in close proximity to the subscriber is input in the origination field 61 shown in FIG. 2A. A POP may be selected on the basis of proximity to either one of the numbers specified in fields 61 or 62. As illustrated in FIG. 2A, a POP pull down menu 64 is preferably provided in GUI 55 for convenient review and selection of the available points of presence (POP). Accordingly, a POP can be selected as part of the call request information to indicate a preferred POP for establishing the call connection. In addition, a POP override flag or button 68 may be provided. If the POP override is selected, the LDSP will ignore any specified POP, and determine a most cost-effective POP for originating the requested call connection based on the originating and terminating numbers. A POP optimization algorithm analyzes the respective numbers and selects the most cost-effective origination point based on the information available. This feature is particularly advantageous for international calls, including satellite calls where point of origin can be particularly important to overall cost, as will be explained below in more detail.

Application 50 may include a directory 74 for storing call request information. This information may be stored in any number of formats, for example as called station numbers or called party names, as shown in telephone number fields 61 and 62, respectively. If information pertaining to a desired called party is stored in a directory file of application 50, the required call station information may be selected for insertion into a telephone number field 61, 62 of GUI 55. A telephone directory may be provided as a pull down menu in the proximity of fields 61, 62 for example, or in any other suitable format. In addition, the GUI 55 may be configured to include default information in the originating telephone number field 61 when call connection requests routinely originate from a particular telephone number. Alternatively, call request information may be manually input from a PCA keypad 66 or other compatible interface. The "dial" feature 58 is selected to initiate the call connection request. Further, call request information may be programmed into a speed dial directory 64 for enabling a fast and easy call connection request. GUI 55 may also include a billing code feature 71 for assigning charges for the call to any predetermined account. This permits a subscriber to differentiate calling records based on substantially any predetermined criteria. Selection of the dial feature 58 prompts call completion application 50 to formulate a call connection request message based on the specified information and transmit the message via a suitable communication connection to the LDSP server 60.

GUI 55 preferably includes an information display window 67 for displaying status information associated with a call connection request. The information display window 67 provides a medium for displaying a notification messages received from a LDSP server 60, indicating the status of the call connection request at the server side. It may also be used to display the duration of the call, for example. A tool bar (not shown) may also be provided in GUI 55 for selecting other features provided by application 50.

For example, web-enabled features compatible with call completion application 50 may be provided in accordance with the present invention, as described in copending U.S. patent application Ser. No. 09/642,671 filed Aug. 22, 2000 and incorporated herein by reference. These web-enabled features are preferably supported by an LDSP web server, and may be accessed by a subscriber from any PCA having the capability to access Internet using a web browser application. When an icon is selected from a tool bar, for example, a compatible web-browser is launched and a web page is downloaded to the PCA. The web page may include a form into which the subscriber inputs information required to enable a selected feature. The completed form is then uploaded from the PCA to the web server and the web-enabled feature is activated. Each web-enabled form may require a subscriber to input subscriber identification information to ensure that the subscriber is authorized to initiate the requested web-enabled feature.

The web-enabled features preferably support complex functionality and data presentation capabilities of the present invention. For example, web-enabled features may include conference calling, country code and time zone information display, long distance rate searches, and account editing capabilities. These web-enabled features are made available via a LDSP web server to subscribers. Other commonly used features, such as directory files and call connection requests, are preferably locally provided by call completion application 50 on the PCA for fast and easy access. As a result, local system resource usage is kept to a minimum and call connection requests can be conveniently and quickly initiated from a PCA. As noted above, a subscriber may be required to input web server user identification to gain access to the respective web-enabled features of the present invention. The web-enabled features of the present invention may be activated or disabled in accordance with the level of service subscribed to by a subscriber.

Figure 2B:
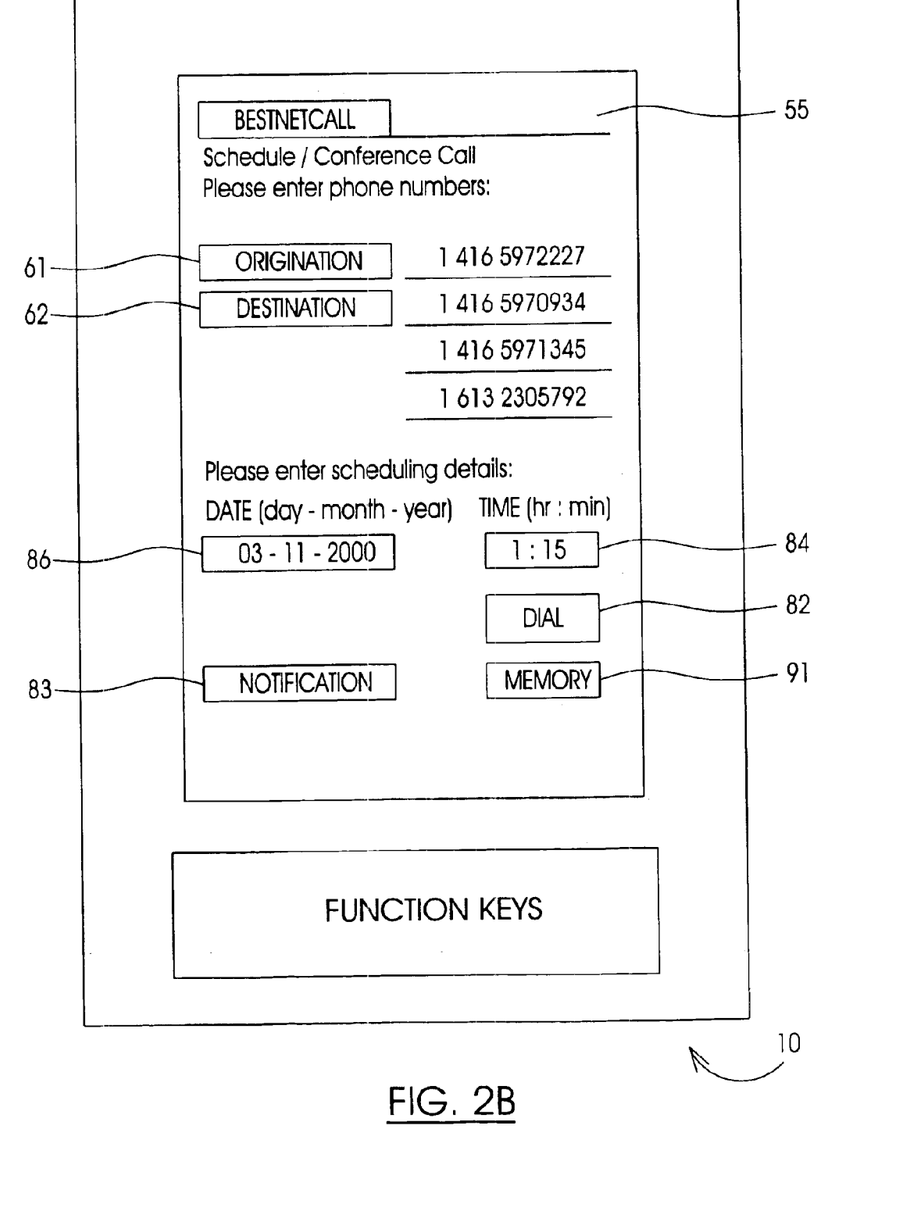
FIG. 2B is an illustration of a graphic user interface (GUI) of a personal communication assistant in accordance with another embodiment of the present invention.

FIG. 2B illustrates another input screen for a GUI 55 in accordance with the present invention. The GUI 55 enables call scheduling and call conferencing capabilities of the present invention. In accordance with this embodiment, a subscriber may place a call scheduling or conference call request to the LDSP 60 by inputting the necessary information in the fields provided in GUI 55. For example, in order to schedule a call a subscriber specifies an origination call address in field 61, and at least one destination call address in field 62. A preferred time and date for the call is also specified in fields 84 and 86, respectively. Once the required call information is specified in the GUI 55 the call scheduling feature may be invoked by selecting the dial feature 82. As a result, a call scheduling request is generated by application 50 based on the call information input in GUI 55 and forwarded to LDSP 60 by application 50. The call scheduling information is processed by LDSP 60 and the scheduling information is stored in a call scheduling queue at LDSP 60. The call information is preferably stored in the call scheduling queue in accordance with the date and time for which the call is scheduled. At the scheduled time, the call information is retrieved from the queue by the call controller 70 and the call information is processed by call controller 70 to complete the call connection specified in the call scheduling request.

If a conference call is desired, more than one destination call address may be input into field 62. If setup of the conference call is desired immediately, the date and time fields 84 and 86 are left blank, and the call request is enabled by selecting the dial feature 82. Alternatively, a conference call may be scheduled by specifying the destination call addresses as well as the preferred time and date for the call in fields 62, 84 and 86, respectively. When a conference call scheduling request is generated from application 50, a notification feature 83 may be selected to provide conference call parties with a notification message to notify that they are being scheduled to participate in a conference call at a given time and date. This notification message is generated by LDSP 60 and forwarded to the conference call parties. The notification may be any suitable communication known in the art, for example an automated voice mail message or an email message. In the event that an email message is the preferred medium for conference call scheduling notification, a corresponding email address may be input in a field associated with each called number (not shown), or a telephone directory along with the telephone number. If email notification is specified, the application 50 preferably verifies that an email address is associated with each destination number input for the conference call. A conference call notification message may provide the scheduled conference call party with an option to respond to the notification. The notification message may include options for accepting, declining or modifying the scheduled conference call. Responses to the notification message are returned to the LDSP 60 and if the conference call is unanimously accepted, the scheduling procedure proceeds as described above. If, however, a conference call scheduling request is declined or modified, an alert message is returned to the party initiating the conference call scheduling request by LDSP 60. This alert message prompts the subscriber for confirmation to proceed in the absence of participation by a requested party, or in accordance with scheduling modifications. Further, a conference call schedule can be stored in memory 91 on PCA 10 to effect a call request from application 50 on a regular basis. Application 50 may be programmed to send a scheduled call request to LDSP 60 at regular intervals to repeatedly initiate a call connection at call controller 70 in accordance with stored call scheduling information. In this manner, a conference call, for example could be initiated on a regular basis according to call connection information stored in memory 91.

As shown in FIG. 2B, GUI 55 includes origination and destination call address fields 61 and 62. A plurality of call addresses may be specified in the destination fields 62 for the purpose of initiating a conference call. The scheduling fields 84 and 86 are provided to specify the date (day/month/year) and time (hour:minute) a call is to be established. A dial feature 82 is provided to initiate the call scheduling and call conferencing features according to call information specified in the application 50. The call scheduling feature of the present invention provides convenient and reliable call setup capability that permits a subscriber to schedule calls as time permits, and receive the calls at preferred times and locations.

Subscriber identification information can be stored by call completion application 50 and sent to an LDSP server 60 with each call connection request if application 50 is preconfigured to store logon information for connecting to LDSP server 60. For example, in order to use the system of the present invention to establish long distance call connections, a subscriber must be authenticated by the LDSP server 60. Identification information is sent to LDSP server 60 with each call connection request message for validation purposes. A validation procedure as conducted by LDSP server 60 validates the incoming request, verifies whether an associated subscriber account is in good standing, and processes and bills the transaction accordingly. Consequently, each subscriber is assigned unique subscriber identification and password information that is stored on LDSP server 60 and used to verify each call connection request. Each time a call connection request is initiated from a call completion application 50, the subscriber is prompted to provide registered subscriber identification information, unless the application 50 is configured to provide this information automatically. This information is received at LDSP 60 and authenticated to determine whether the subscriber is in good standing before the call connection request is processed. Subscriber access to the LDSP server 60 can be denied if an account is determined to be overdue, for example.

If the subscriber identification information is determined to be valid, a message authorizing the application 40 to proceed with the call connection request is returned to the call completion application 50 via the communication connection. In response to this message, the application 50 forwards call connection request information to the LDSP server 60. At the LDSP server 60, information packets contained in the call connection request message are extracted and processed by various components of the LDSP server 60. As a result of such processing, a call connection information packet is dispatched to a call controller 70 to initiate the call connection. Communication connections between the LDSP server 60 and the call controllers 70 may be established using a number of methods known in the art. For example, a direct connection 62 such as an Ethernet connection may support communication between LDSP server 60 and call controllers 70. Alternatively, the packet network 100 may be used to connect LDSP server 60 and the call controllers 70 for transmission of call connection information packets.

Figure 3A:
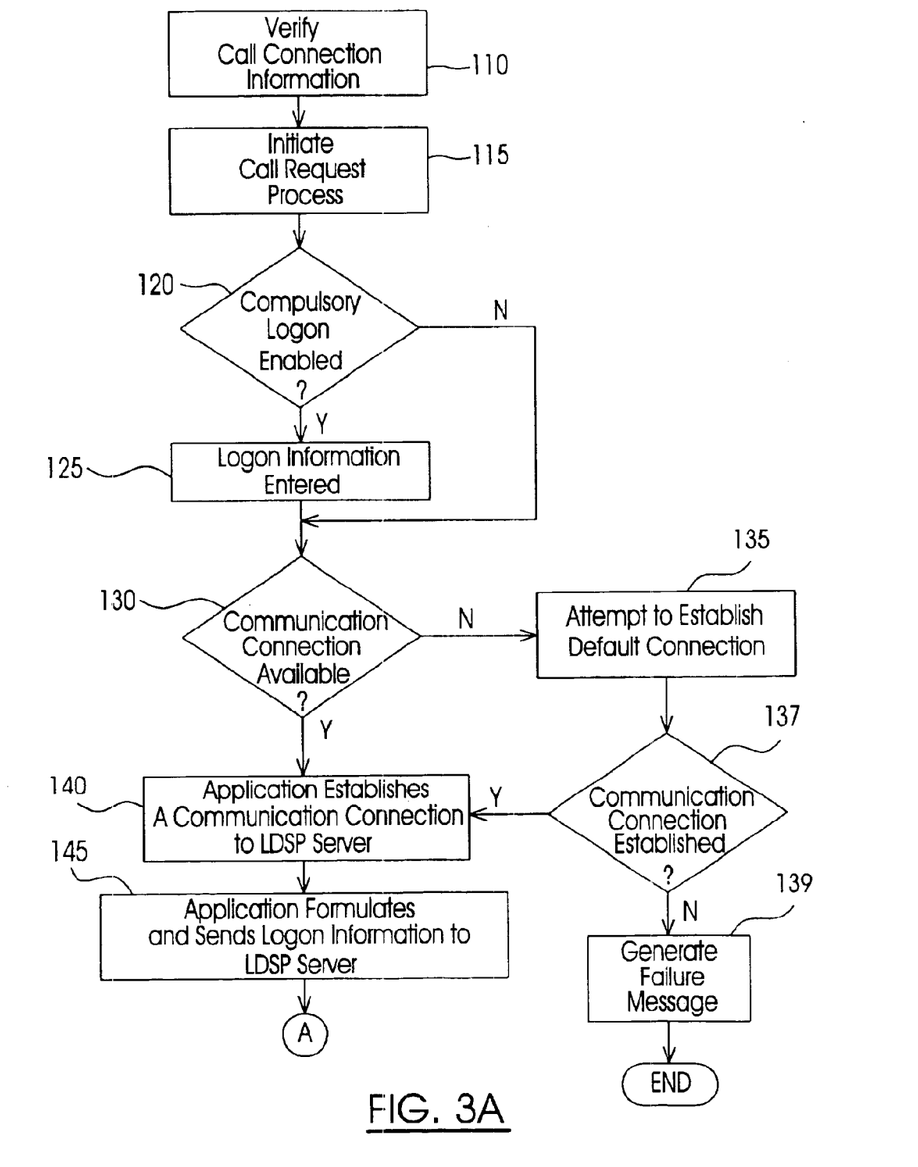
FIG. 3A is a flow chart illustrating an information processing procedure performed by a call completion application in accordance with the present invention.

FIG. 3A illustrates the principal steps involved in establishing a typical long distance call connection in accordance with an embodiment of this invention. A subscriber initiates a call connection request using call completion application 50 on PCA 10. At step 110, call connection information is input into application 50 and verified. In the case where a call connection request relates to a conference call connection request, at least two destination call addresses will be specified in field 62 of GUI 55. As described above, call completion application 50 preferably includes call setup features such as call directory, speed dial and billing code selection. Using these features, a subscriber may quickly and conveniently specify details required to request a call connection over the PSTN. Alternatively, a subscriber may input the required information in the appropriate fields of the GUI 55, such as originating and destination addresses and User ID and password, for example. When the information has been input and verified, a call request is initiated from application 50 (step 115). The call request is initiated, for example, by selecting the dial icon 58 (FIG. 2A). A call connection request message is formulated by application 50 when the call request is initiated in step 115. At step 120, application 50 checks whether a compulsory logon feature is enabled. If compulsory logon is enabled, a subscriber will be prompted for registered logon information each time a call connection request is initiated (step 125) in order to control unauthorized use of the present invention. Alternatively, compulsory logon may be disabled to improve convenience and efficiency. In either case, registered logon information is provided for authentication to the LDSP 60.

At step 130, application 50 checks for a suitable communication connection for establishing a connection with the LDSP 60. If a suitable communication connection is available, application 50 proceeds to establish a communications connection with the LDSP server 60 via the packet network (step 140). A communications connection may be established using any suitable protocol for providing a messaging service between a PCA 10 and the LDSP server 60. For example, PCA 10 may be capable of establishing wireless communications with a data packet network or alternatively adapted for a dial-up connection.

If a suitable communication connection is not found, application 50 proceeds to attempt to establish a default packet network connection at step 135, before proceeding to step 140. A packet network connection may be established in step 135 in accordance with any known method. If a communication connection is established (step 137) application 50 proceeds to establish a communication connection with LDSP 60 (step 140). If a communication connection is not detected at step 137, a failure message is generated and displayed on GUI 55 (step 139) to end the call request attempt. At step 145 encrypted logon information is sent to the LDSP server 60 containing the subscriber user ID and password information. As mentioned above, saved logon information is sent by application 50 if the compulsory logon feature is disabled at step 120.

Figure 3B:
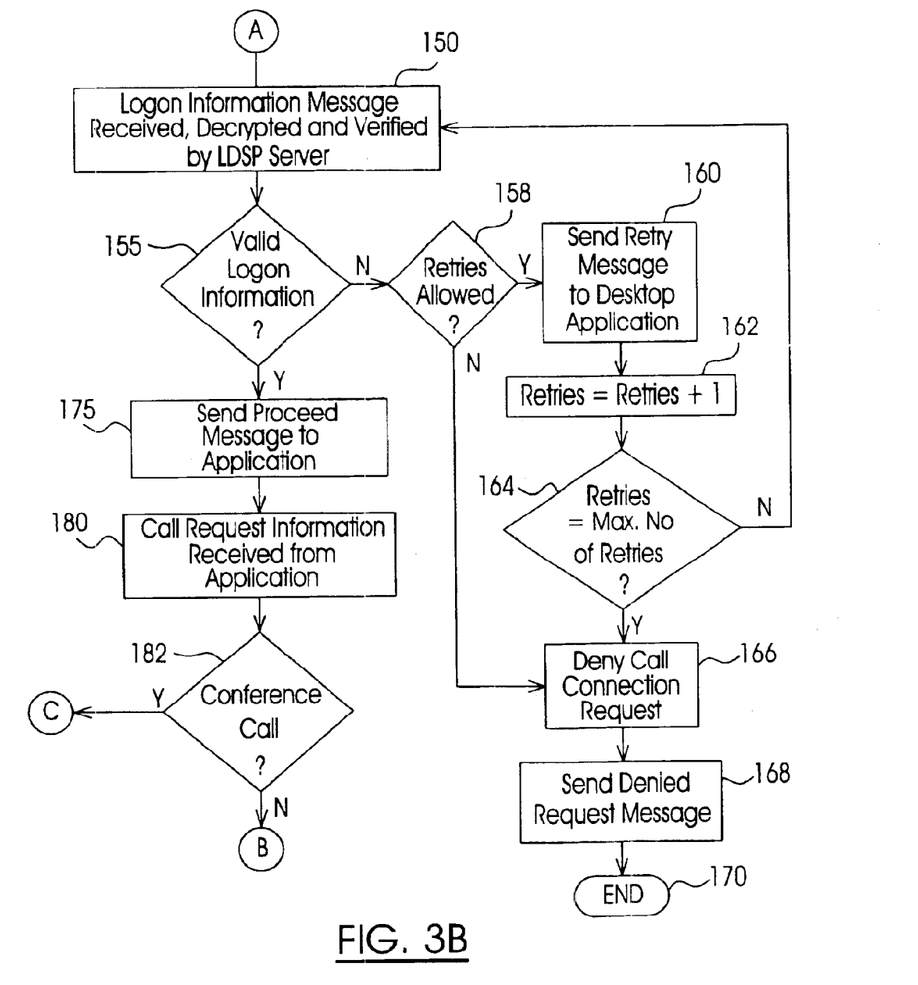
FIG. 3B is a flow chart illustrating an information processing procedure performed by a long distance service provider server in accordance with the present invention.

FIG. 3B illustrates the principal steps performed at LDSP server 60 in response to a call connection request initiated by call completion application 50. An encrypted logon information message is received from application 50 and subsequently decrypted and verified by the LDSP server 60 (step 150). Decryption and verification of a logon information message may be performed in any number of ways known in the art for maintaining a secure system accessible only to Registered subscriber-s. Verification may be performed by LDSP server 60 by checking subscriber identification information contained in the logon information against subscriber identification information stored in a long distance service provider database (not shown) associated with the LDSP server 60. A subscriber's identification information is preferably also processed to identify a corresponding account number and the status of that account is determined. An account database storing account information corresponding to each registered subscriber is preferably maintained. If the validation performed at step 150 fails, a series of retry steps may be initiated (steps 160–164), if the LDSP server 60 is configured to permit logon retries as determined at step 158. If so, a retry message is sent to call completion application 50 (step 160) and a retry counter is incremented (step 162). Unless a maximum number of retries has been attempted (step 164), another logon attempt is repeated from PCA 10 and LDSP server 60 returns to step 150. If a predetermined maximum number of retry steps are performed without success, the call connection request is denied (step 166), and a denied request message is sent to application 50 (step 168). A denied request message may specify why a request was denied, for example, "subscriber identification information not recognized", "credit card not accepted" or "account balance owing". When a denied request message is generated and sent to application 50, the call connection processing procedure of the LDSP server is terminated (step 170).

If the logon information in step 155 is determined to be valid, the procedure for establishing a call connection continues with the LDSP server 60 sending a message instructing application 50 to proceed with the request (step 175). In this manner, a message is returned to the PCA 10 from the LDSP 60 via the communication connection established in step 135. In response to this message, at step 180, call request information is received from the call completion application 50 containing the call request information entered in step 110. In an embodiment of the present invention, LDSP 60 may be programmed to terminate connection with a PCA 10 after call request information is received. For example, LDSP 60 may terminate connection with the PCA 10 supporting application 50 immediately upon sending a logon status message such as the message sent in step 175. In the case where PCA 10 is connected to an ISP via a dial-up connection, LDSP 60 will close its connection with the ISP. Accordingly, LDSP resources are not consumed by messaging delays. Application 50 is programmed to automatically re-establish any closed connections when additional call request information is sent from the PCA 10 to the LDSP 60.

Upon receipt of the call request information (step 180) LDSP server 60 checks the call request information to determine if a conference call has been requested (step 182). If a conference call is not identified, LDSP 60 proceeds according to the steps outlined in FIG. 3C. However, as discussed below, in the event that a conference call is identified in the call request information, a POP optimization algorithm is automatically initiated by LDSP 60 to determine the most advantageous POP to handle the conference call. This optimization step is performed regardless of a POP specification in application 50. Since conference call bridging capability is not available on all POPs within the PSTN, a conference call optimization algorithm is provided to automatically identify the most advantageous POP available to handle the call when a conference call request is received. Thus, a POP having conference call bridging capability and able to establish the most cost-effective call connection will be selected by the conference call optimization algorithm.

Figure 3C:
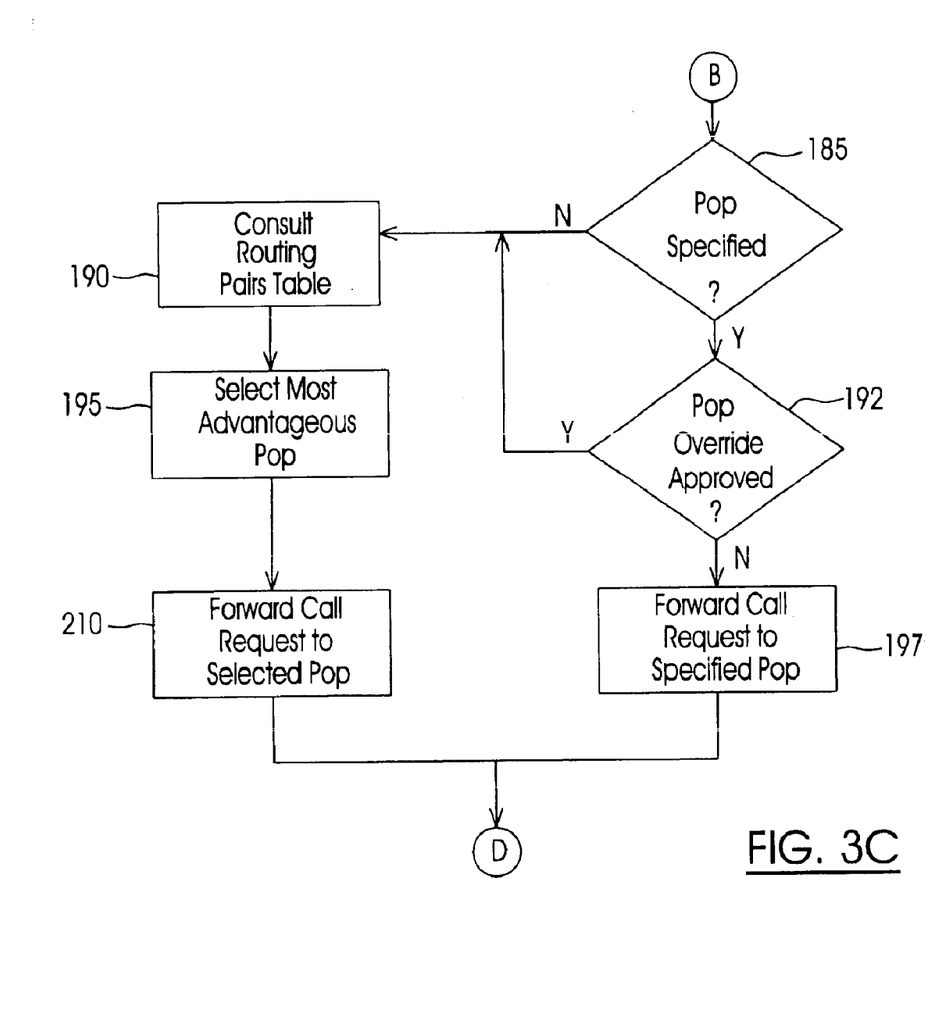
FIG. 3C is a flow chart illustrating an information processing procedure performed by a long distance service provider server in accordance with another embodiment of the present invention.

As illustrated in FIG. 3C, if the call request information does not specify a conference call request, a check is performed by LDSP 60 to determine whether a POP is specified in the call request information (step 185). As described above, GUI 55 preferably enables a POP from which the call connection is originated to be selected. In addition, application 50 may be configured with a flag to permit POP override. The POP override flag instructs the LDSP 60 to select a POP from which the call is to be originated using an optimization algorithm, as noted above. If a POP is not specified in the call request information received from application 50, LDSP 60 consults a routing pairs table, an example of which is shown in Table 1 below, (step 190) to determine the most advantageous POP to carry the call connection request. A POP is selected in step 195 on the basis of the call request information received from application 50. The call connection request is then forwarded to a call controller 70 associated with the selected POP to effect the call connection (step 210). Alternatively, if a POP is specified in the call request information received in step 180, LDSP 60 performs a check to determine if POP override is approved (step 192). If so, LDSP performs step 190 and the routing pairs table is consulted. If POP override is not approved then LDSP 60 proceeds to step 197 and the call connection request is forwarded to the call controller 70 at the specified POP (step 197) to effect the call connection. Preferably, in both steps 197 and 210 the call request information is forwarded to the respective call controller 70 via a call connection information packet. LDSP 60 may send a call status message to the call completion application 50 at any time while the call connection is in progress to advise the subscriber of the call progress if a communication connection is available. For example, upon receipt of the call request information in step 180, a "call connection in progress" message may be returned to application 50.

Figure 3D:
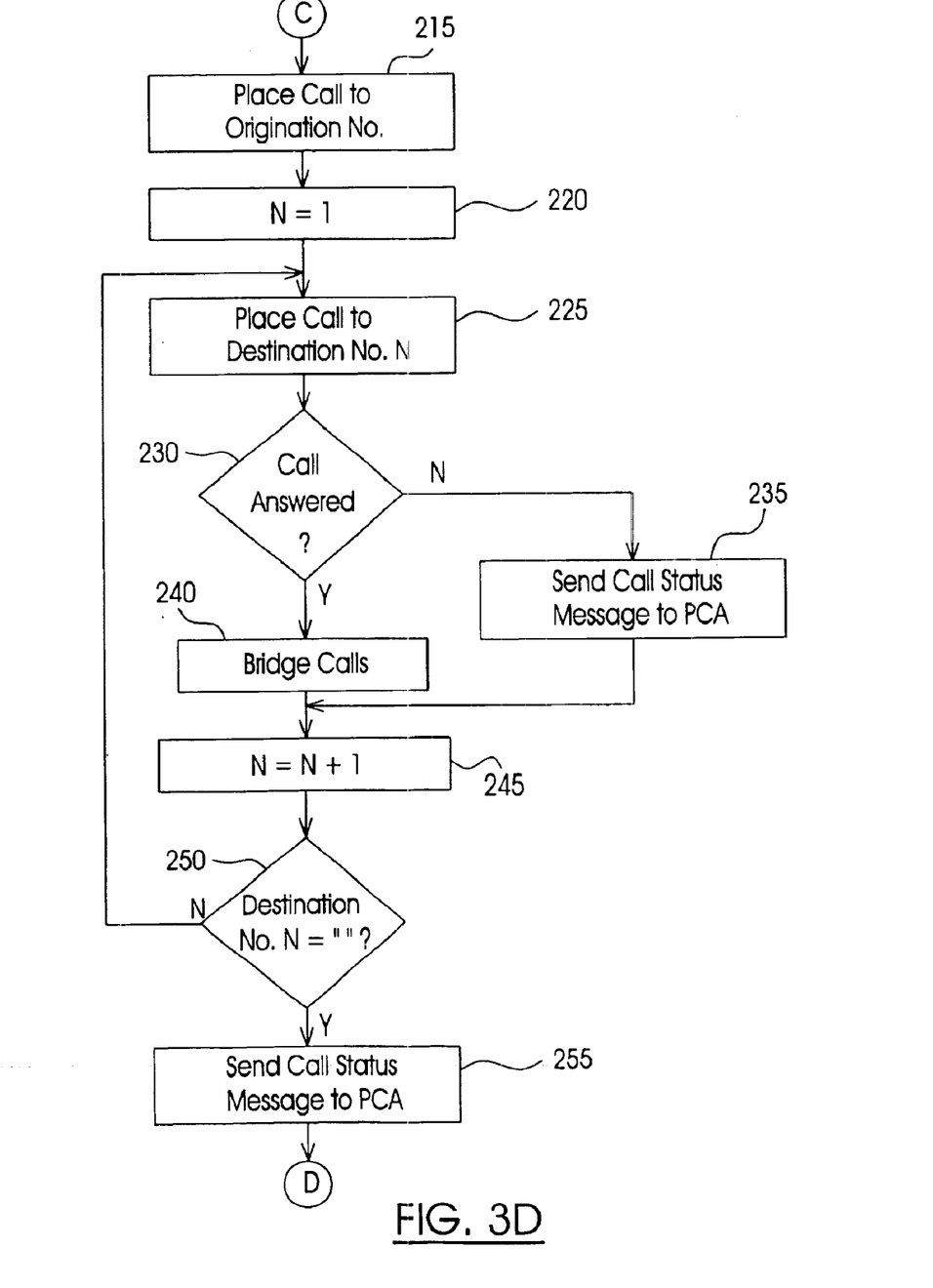
FIG. 3D is a flow chart illustrating an information processing procedure performed by a call controller in accordance with the present invention.

FIG. 3D illustrates the principal steps preferably performed by call controller 70 in response to a conference call connection request. If a call connection request is for a conference call as determined at step 182, LDSP 60 notifies call controller 70 with a call connection information packet. Upon receipt of the call connection information packet, the call controller 70 is programmed to establish calls to the originating and destination telephone numbers from the associated POP 40, and bridge the calls. The call connection information packet preferably includes a POP selection for carrying the conference call connection as identified by a POP optimization algorithm at LDSP 60. In addition, call connection information packet instructs the call controller 70 to establish calls to the specified call addresses from the selected POP. As illustrated in FIG. 3D, upon receipt of the call connection information packet, call controller 70 instructs POP 40 to place a call to an origination number (step 215). At step 220, call controller 70 sets a variable "N" to N=1. Next, call controller 70 instructs POP 40 to place another call to a first destination number (step 225) as specified in the call connection information packet. After the second call is placed, call controller 70 performs a check (step 230) to determine if a call answer message is received from the respective POP. If a call answer message is received from the POP, call controller 70 send an instruction to the POP 40 instructing the calls to be bridged together (step 240). In the absence of a call answer message, call controller sends a call status message to the PCA (step 235). Following either of steps 235 or 250, the variable "N" is incremented by 1 (N=N+1) the call controller 70 at step 245. At step 250, a check is performed to determine if an Nth occurrence of a destination number array of the information packet is empty. If another number exists in the destination number array, call controller 70 returns to step 225 to place a call to that number. Steps 230 to 250 are subsequently repeated, until the destination number array is determined to be empty. In doing so, calls are placed from POP 40 to each of the destination numbers specified. At step 255, a call status message is sent to the PCA. At this point, a message may specify "conference call is now in progress", for example.

Figure 3E:
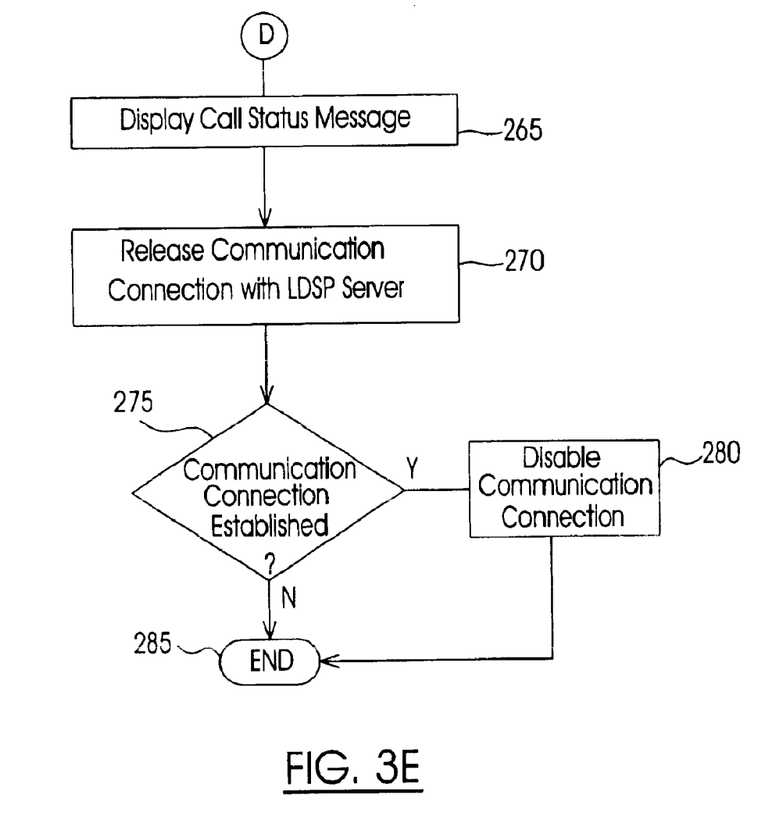
FIG. 3E is a flow chart illustrating another information processing procedure performed by a call completion application in accordance with the present invention.

FIG. 3E illustrates the principal steps preferably performed by call completion application 50 at a PCA 10 in response to a call status message sent in step 255 (FIG. 3C). The call status message is received at PCA 10 by call completion application 50 and a call status message is displayed in an information display window 67 (FIG. 2) provided in GUI 55 (step 265). Application 50 then proceeds to release the communication connection established between the PCA 10 and the LDSP server 60 (step 270) and checks whether a communication connection was established at step 140 (step 275). If a communication connection was not established by the call completion application 50 at step 40, no further action is taken and the procedure ends at step 285. Alternatively, if it is determined that a packet network connection was established by the application 50 at step 140, then that connection is closed (step 280), and the procedure is ended (step 285).

The call management procedures performed by the LDSP 60 are billed to subscribers using known billing mechanisms such as described in Applicant's copending U.S. patent application Ser. No. 09/642,571 referred to above.

The present invention is particularly adapted to provide cellular telephone users with a convenient and cost effective means for establishing long distance calls. When the present invention is employed to establish long distance calls, the POP specification feature is particularly advantageous to cellular or PCS subscribers because cellular telephone addresses do not generally contain sufficient information to identify a location of the phone at any given time. Accordingly, a subscriber to long distance service in accordance with the invention can leverage the cost advantages of the service by specifying the POP from which the call is originated in order to avoid inbound long distance charges, in addition to avoiding long distance charges at wireless rates.

The present invention also has particular advantages when used to establish international call connections. International telephone addresses include enough information related to location of the called parties to achieve significant optimization. Based on this information, a call connection can be optimized by consulting a call pair routing table, which is schematically illustrated in Table 1 shown below. A call optimization algorithm executed by the LDSP 60 consults the call routing table to determine a most cost effective POP from which to originate a call connection. Point of origination for calls can significantly affect a total cost of a call. This is especially true of special call services such as satellite call services, and the like.

TABLE 1

| Orig. | Dest. | | | | | | |
|---|---|---|---|---|---|---|---|
| | CA | CN | PH | JP | KR | SG | US |
| Canada (CA) | | | | | | | |
| China (CN) | | | | | | | |
| Philippines (PH) | | | | | | | |

TABLE 1-continued

| Orig. | Dest. | | | | | | |
|---|---|---|---|---|---|---|---|
| | CA | CN | PH | JP | KR | SG | US |
| Japan (JP) | | | | | | | |
| Korea (KR) | | | | | | | |
| Singapore (SG) | | | | | | | |
| United States (US) | | | | | | | |

With respect to satellite services, the present invention is advantageous for mobile satellite telephone users, as this is typically an expensive service and outbound satellite mobile telephone calls often incur several minutes of call setup time. However, if the call is set up as an inbound call requested by the PCA 10 the call set up charges are avoided. Furthermore, the call may be established using a special routing pairs table to further save by launching the call form a most cost effective POP. In some developing countries terminal identification device numbers transmitted by a device on an outgoing call are ignored. Hence, regardless of satellite device type (rated 1 to 6) the most expensive rate (6) is always charged. By scheduling a terrestrial to satellite call, the incoming satellite call is rated at the proper rating.

Another problem is that in some countries uplink to satellite telephone is prohibited creating great difficulty in communicating in remote areas, such as may be experienced by petro-chemical companies operating in remote areas. Again, by using a PCA 10 and application 50 to request an incoming call this problem may be overcome.

The present invention therefore provides a call completion application adapted for use with a PCA for effecting convenient and cost effective call management and connection from any location where Internet access is available to the PCA.

The embodiments of the invention described above are intended to be exemplary only. The scope of the invention is therefore intended to be limited solely by the scope of the appended claims.

I claim:

1. A method of completing a long distance call connection through the public switched telephone network (PSTN) from a personal communication assistant (PCA), said method comprising:
   a) accepting call request information specified by a subscriber using an interface supported by the PCA, the call request information including a call origination number and at least one call destination number;
   b) formulating a call connection request message based on the call request information, the call connection request message including a point of presence (POP) code that specifies switching equipment in the PSTN from which the call is to be originated; and
   c) forwarding the call connection request message via a communications connection established between the PCA and a long distance service provider server (LDSP) to initiate the call connection.

2. The method as claimed in claim 1, wherein said POP code specifies a particular POP in the PSTN fin which the call connection is to be originated.

3. The method as claimed in claim 1, wherein said POP code is associated with a POP override parameter for identifying to the LDSP whether the specified POP must be used to originate the call connection, or may be overridden if a call optimization algorithm indicates a more cost-effective POP for originating the call.

4. The method as claimed in claim 1, wherein at least a part of the call request information is selected from a directory stored on the PCA.

5. The method as claimed in claim 1, wherein said call request information is specified in call information fields within said interface.

6. The method as claimed in claim 1, wherein formulating the call connection request message is initiated when the registered subscriber selects a dial icon on the interface.

7. The method as claimed in claim 6, wherein the application is adapted to retrieve subscriber information stored by the application on the PCA when the call connection request is formulated.

8. The method as claimed in claim 1, wherein forwarding the call connection request message includes a stop of determining whether a packet network connection is available from said PCA and, if the packet network connection is not available, attempting to establish the packet network connection in order to enable sending the request.

9. The method as claimed in claim 8, wherein said packet network connection is a wireless connection.

10. The method as claimed in claim 8, wherein forwarding the call connection request message includes a step of forwarding subscriber identification information.

11. The method as claimed in claim 10, further comprising steps of:
a) receiving a confirmation message from the LDSP confirming the subscriber identification information; and
b) forwarding the call connection request message containing the call request information.

12. A method of completing a long distance can connection through the public switched telephone network (PSTN) from a call completion application operating locally on a personal communication assistant (PCA) adapted for communications with a long distance service provider server via a packet network, said method comprising steps of:
a) receiving from the PCA a call connection request message at the long distance service provider server, the call connection request message including a call origination number and at least one call destination number;
b) verifying user identification information contained in the message;
c) processing the call connection request message to initiate a call connection according to the call request information to the call origination number and the at least one call destination number; and
d) sending a notification message to the PCA to notify a subscriber that the call connection is in progress.

13. The method as claimed in claim 12, wherein processing the call connection request message includes:
a) identifying a point of presence (POP) code contained therein; and
b) determining if a POP override parameter has been set by the subscriber.

14. The method as claimed in claim 13, wherein if it is determined that the POP override parameter has been set, said LDSP consults a routing pairs table to determine a POP within the PSTN to originate the call connection requested.

15. The method as claimed in claim 14, wherein the POP override parameter is associated with a POP code.

16. The method as claimed in claim 15, wherein the POP code is selected to initiate a cost-effective call connection.

17. The method as claimed in claim 12, wherein the step of processing the call connection request message further comprises steps of:
a) formulating a call request packet based on information contained in the call connection request message; and
b) forwarding the call request packet to a call controller to effect a call connection from a point of presence (POP) within the PSTN based on information contained in said call connection request message.

18. The method as claimed in claim 12, wherein said step of receiving a call connection request message further comprises steps of:
a) receiving a first message from said PCA containing subscriber identification information;
b) sending a confirmation message to said PCA authorizing said user identification information; and
c) receiving a second message from the PCA containing the call origination number and at least one call destination number identifying call origination and destination addresses to be joined by a call connection.

19. The method as claimed in claim 1, wherein the call request information specified by the subscriber includes a call scheduling parameter.

20. The method as claimed in claim 19, wherein the call scheduling parameter includes call scheduling information for scheduling a call connection.

21. The method as claimed in claim 20, wherein the call scheduling information includes a date and a time for establishing the call connection.

22. The method as claimed in claim 19, wherein the call scheduling parameter includes a notification response parameter instructing the LDSP server to send a notification message to each party identified in said call request information.

23. The method as claimed in claim 22, wherein the notification response parameter further includes a confirmation response parameter instructing the LDSP to return a confirmation message to the PCA coning the availability of each party for the call connection.

24. A system for establishing a long distance call connection through the PSTN, using a personal communication assistant (PCA), said system comprising:
a) a long distance service provider (LDSP) server adapted to establish said call connection through the PSTN in response to a call connection request message received from a registered subscribe, the call connection request message including a call origination number and at least one call destination number;
b) an application adapted to operate local on the PCA to accept call request information from the registered subscriber; formulate the call connection request message based on the call request information; and communicate the call connection request message to the long distance service provider server;
wherein the long distance service provider server is adapted to effect a long distance call connection between the call origination number and the at least one call destination number on the basis of the call connection request message.

25. The system as claimed in claim 24, wherein said long distance service provider server further comprises:
a call controller adapted to receive a call connection information packet from said LDSP server related to the call connection request message and establish said call connection.

26. The system as claimed in claim 24, wherein said application includes means for establishing a communication connection with said LDSP server to communicate the call connection request message.

27. The system as claimed in claim 26, wherein said means for establishing a communication connection includes means for determining if an existing packet network connection is available, and means for establishing a packet network connection if a connection is not available.

28. The system as claimed in claim 26, wherein said means for establishing a communication connection is a wireless interface.

29. The system as claimed in claim 24, wherein said application further comprises means for encrypting call connection request messages.

30. The system as claimed in claim 24, wherein the call connection request message includes a POP code specified in the application by the registered subscriber for indicating a preferred point of presence within the PSTN for originating the call connection.

31. The system as claimed in claim 24, wherein the call connection request message includes a POP override parameter that may be set to instruct the LDSP server to use a least cost optimization algorithm to select a POP for establishing the call connection.

32. The system as claimed in claim 24, wherein the call connection request is for a conference call and the least cost algorithm automatically selects a POP for establishing a call connection.

33. The system as claimed in claim 24, wherein the call connection request is for a satellite call and the least cost algorithm uses a special call pair routing table to determine a least cost POP for originating the call to ensure that a satellite leg of the call is completed at a least cost.

34. The system as claimed in claim 31, wherein the least cost optimization algorithm selects a POP to minimize the cost of the call connection based on the origination and the at least one destination numbers contained in the call connection request message.

35. The system as claimed in claim 24, wherein the call connection request message includes a call scheduling parameter that includes call scheduling information for scheduling the establishment of a call connection.

36. The system as claimed in claim 35, wherein the call scheduling information includes a date and a time to establish the call connection.

37. The system as claimed in claim 36, wherein the LDSP server is adapted to verify the call scheduling information and schedule the call connection according to the specified call scheduling information.

38. The system as claimed in claim 35, wherein the call scheduling parameter includes a notification response parameter instructing the LDSP to send a call scheduling notification message to each party address specified in the call connection request message.

39. The system as claimed in claim 38, wherein the notification message includes a means for providing an availability response message to the LDSP in response to the notification message.

40. The system as claimed in claim 38, wherein the notification response parameter further includes a confirmation response parameter instructing the LDSP to return a confirmation response to the PCA indicating the availability of each part.

41. The system as claimed in claim 38, wherein the party address is a telephone address and the notification message is an automated voice message.

42. The system as claimed in claim 38, wherein the party address is an electronic mail address and the notification message is an automated electronic mail message.

43. The system as claimed in claim 37, wherein the LDSP server is further adapted to receive a reply to the notification message from each of the called parties and send a corresponding scheduling confirmation message to the application operating locally on the PCA.

44. The system as claimed in claim 37, wherein the LDSP places call scheduling information in a call queue and the call controller retrieves the call scheduling information from the call queue to effect the call connection.

45. The system as claimed in claim 44, wherein call scheduling data is placed in the call queue in accordance with a scheduled date and time for effecting the call connection.

46. A call completion application adapted to operate locally on a personal communication assistant (PCA) to establish a communication connection with a long distance service provider (LDSP) server, said call completion application comprising:

a) means for accepting call connection information input by a subscriber, the call connection information including a call origination number and at least one call destination number;

b) means for formulating a call connection request message based on said call connection information;

c) means for determining if an existing packet network connection is available;

d) means for establishing a packet network connection if an existing packet network connection is not available; and e) means for sending the call connection request message to said LDSP server using the packet network connection.

47. A call completion application as claimed in claim 46, wherein the mean for receiving call connection information is a graphical user interface.

48. A call completion application as claimed in claim 46, wherein the means for sending the call connection request message further comprises means for sending user identification information to the LDSP server for verification.

49. A cal completion application as claimed in claim 46, further comprising means for closing the communication connection after a call connection is initiated.

50. A computer-readable memory storing the call completion application as claimed in claim 46.

51. The call completion application as claimed in claim 46, further comprising a programmable speed dial feature.

52. The call completion application as claimed in claim 47, wherein the graphical user interface includes a field for accepting a point of presence (POP) code.

53. The call completion application as claimed in claim 52, wherein the interface further includes a field that accepts a parameter for indicating that the LDSP may select a POP for originating the call.

54. The call completion application as claimed in claim 46, further comprising a call scheduling feature for inputting call scheduling information.

55. The call completion application as claimed in claim 54, further comprising a notification feature for notifying each call party specified in the call connection information of a call scheduling procedure initiated by the subscriber.

56. The call completion application as claimed in claim 55, wherein the notification feature may query the call completion application for a notification address for sending a notification message.

57. The call completion application as claimed in claim 56, wherein the notification address is an electronic mail address stored on the PCA.

58. The call completion application as claimed in claim 56, wherein the notification address is a telephone address corresponding to the telephone address specified in the call connection information.

59. The call completion application as claimed in claim 55, further comprising means for displaying a confirmation response message from the LDSP server.

60. The call completion application as claimed in claim 59, wherein the confirmation response message advises of a call party's availability for the call connection.

* * * * *

UNITED STATES PATENT AND TRADEMARK OFFICE
CERTIFICATE OF CORRECTION

| | |
|---|---|
| PATENT NO. | : 6,879,678 B1 |
| APPLICATION NO. | : 09/709343 |
| DATED | : April 12, 2005 |
| INVENTOR(S) | : Lang |

It is certified that error appears in the above-identified patent and that said Letters Patent is hereby corrected as shown below:

On the Title Page:
Section (73) Assignee: Change "Softalk, Inc. Toronto (CA)" to --Internet Operator (Asia) Pte., Ltd., Summer Garden, Singapore--

Signed and Sealed this

Twenty-first Day of November, 2006

JON W. DUDAS
*Director of the United States Patent and Trademark Office*